United States Patent
Kuepper

Patent Number: 5,520,816
Date of Patent: May 28, 1996

[54] ZERO WASTE EFFLUENT DESALINATION SYSTEM

[76] Inventor: Theodore A. Kuepper, 4907 Marlin Way, Oxnard, Calif. 93035

[21] Appl. No.: 292,037

[22] Filed: Aug. 18, 1994

[51] Int. Cl.⁶ ............... B01D 61/06; B01D 61/12
[52] U.S. Cl. ............ 210/649; 210/137; 210/195.2; 210/257.2; 210/652; 210/744; 210/805
[58] Field of Search .............. 210/97, 137, 182, 210/184, 194, 195.2, 257.1, 257.2, 258, 321.6, 652, 86, 649, 650, 739, 805, 744

[56] References Cited

U.S. PATENT DOCUMENTS

| | | | |
|---|---|---|---|
| 3,505,216 | 4/1970 | Kryzer | 210/321.6 |
| 3,746,640 | 7/1973 | Bray | 210/652 |
| 4,626,346 | 12/1986 | Hall | 210/257.2 |
| 4,885,085 | 12/1989 | Beall | 210/257.2 |
| 4,981,594 | 1/1991 | Jones | 210/195.2 |
| 5,000,845 | 3/1991 | Solomon | 210/134 |
| 5,009,777 | 4/1991 | Solomon | 210/134 |
| 5,076,913 | 12/1991 | Miller et al. | 210/195.2 |
| 5,078,864 | 1/1992 | Whittier | 210/137 |
| 5,091,093 | 2/1992 | Herwig et al. | 210/639 |
| 5,116,507 | 5/1992 | Ebbins et al. | 210/639 |
| 5,122,265 | 6/1992 | Mora et al. | 210/134 |
| 5,174,901 | 12/1992 | Smith | 210/652 |
| 5,232,591 | 8/1993 | Solsmon | 210/257.2 |
| 5,254,257 | 10/1993 | Brigano et al. | 210/639 |
| 5,256,279 | 10/1993 | Voznick et al. | 210/86 |
| 5,282,972 | 2/1994 | Hanna et al. | 210/257.2 |

*Primary Examiner*—Joseph W. Drodge
*Attorney, Agent, or Firm*—Marvin E. Jacobs

[57] ABSTRACT

The present invention is directed to a water desalination system that can be used in a home or commercial entity which uses a reverse osmosis or nanofilter membrane element in a unique flow configuration which promotes self cleaning of a membrane element to prevent a buildup of salts and minerals on the membrane surface. The systems use the dynamics of water usage in a water service line, not connected to the membrane to flush a recirculation/reservoir tank that feeds the reverse osmosis or nanofilter membrane periodically. The systems also produce little or no waste effluent that must be dumped into a waste system, thereby wasting water and causing an environmental problem.

12 Claims, 11 Drawing Sheets

ZERO WASTE EFFLUENT DESALINATION SYSTEM

BACKGROUND OF THE INVENTION

1. Field of the Invention

The present invention relates to water desalination system configurations that will provide a continuous supply of treated water without creating waste products. These systems are commonly referred to as zero waste effluent systems. A significant feature of the present designs is that they allow zero waste effluent operation without prematurely fouling the desalination membrane being used.

2. Description of the Prior Art

In the prior art it is known to purify (or treat) water through a variety of commercially available water treatment devices designed for point-of-use applications in the commercial/residential water treatment market. The most popular devices are based on the following technologies: activated carbon for organic removal; ultraviolet light disinfection; ion exchange for hardness removal (water softening), and reverse osmosis (RO) desalination.

Desalination devices that use reverse osmosis (RO) membrane elements always create two streams of water as the water exits the RO module: desalinated product water (which has passed through the membrane), and a waste brine (that has flowed across the membrane surface). This waste brine stream is necessary to flush salts and minerals away from the membrane so they don't accumulate and foul the membrane surface. A buildup of salts and minerals in the feed-water to the RO membrane must not be allowed to occur continuously or dissolved substances can precipitate and form a solid on the surface of the membrane. If this occurs, the membrane will be irreversibly scaled (fouled) and must be replaced. This characteristic of the RO membrane poses a significant problem in reducing waste effluent.

The prior art also includes descriptions of ion exchange devices used to soften so called "hard water". The problem with the prior art conventional water softening systems is they use ion exchange technology to remove the hardness components of water (calcium and magnesium ions), and exchange them for sodium ions in order to create "soft water". When regeneration of the ion exchange media takes place, a concentrated water stream of sodium, chloride, calcium and magnesium ions goes into the waste system creating an environmental waste disposal problem.

In a conventional residential or home RO water treatment system, the standard ratio of water wasted to water produced is approximately 5 to 1, or 5 gallons wasted for each gallon produced. This is true only if the product water goes to atmospheric pressure after exiting the RO module. Actually, the ratio can be as much as 10 to 1, or higher, because an air captive storage tank is commonly used to store RO product water. This form of tank exerts a back pressure that restricts water flux through an RO membrane as the tank is filling. Therefore, an appreciable amount of water is wasted with a conventional home RO system.

SUMMARY OF THE INVENTION

The present invention is directed to a water desalination and softening system that can be used in a home or commercial entity which uses a reverse osmosis or nanofilter membrane element that is self cleaning to prevent a buildup of salts and minerals on the membrane surface. The systems use the dynamics of water usage in a building to flush a recirculation/reservoir tank that feeds the RO or nanofilter membranes periodically. The systems also produce little or no waste effluent that must be dumped into a waste system, thereby wasting water and causing an environmental problem.

These and other objects and advantages of the present invention will be fully apparent from the following description, when taken in connection with the annexed drawings.

DESCRIPTION OF THE PREFERRED EMBODIMENT

Figure 1A:
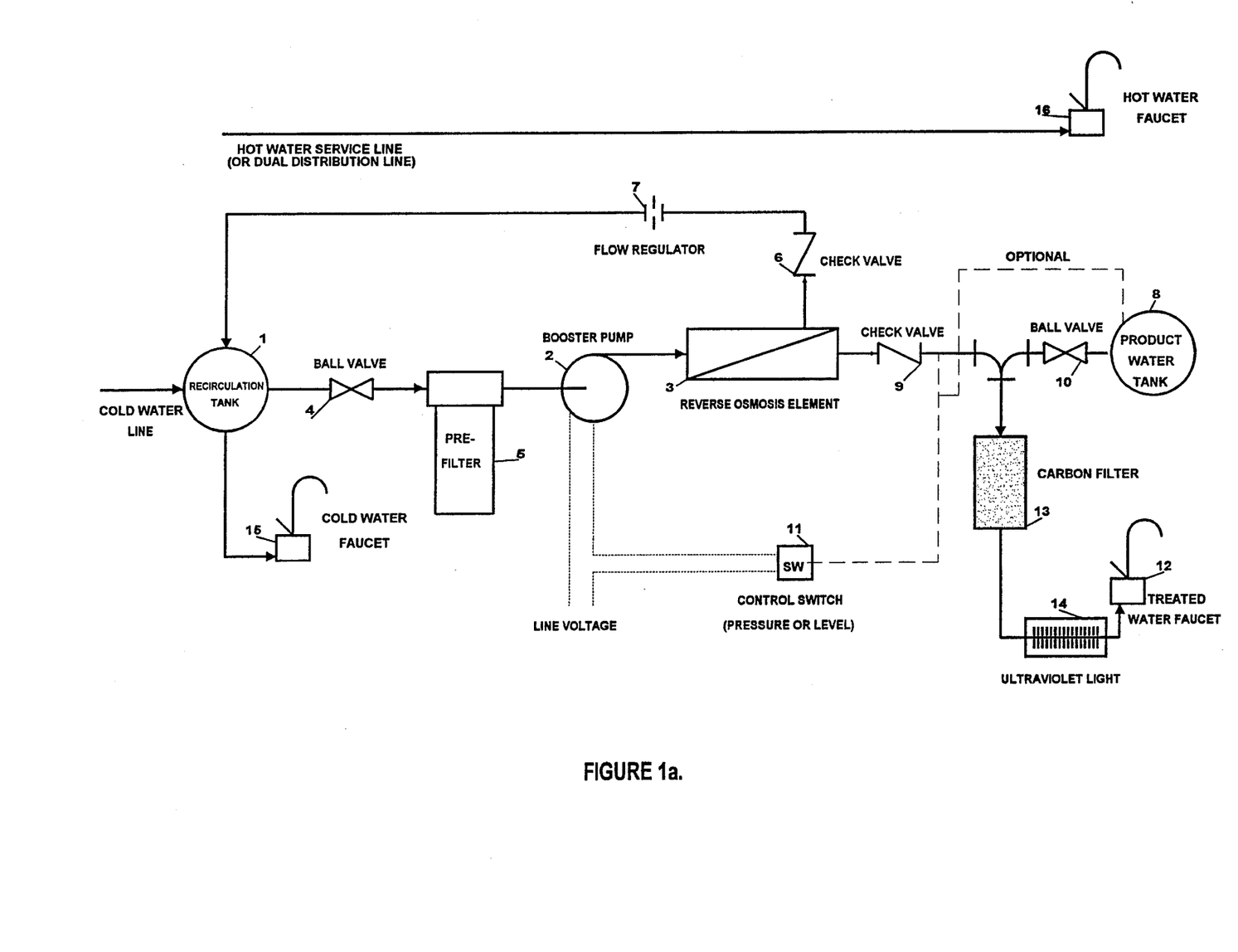
FIG. 1a shows the basic zero effluent water treatment system using a self cleaning reverse osmosis membrane element.

Referring to FIG. 1a, there is shown a zero effluent desalination system according to the present invention comprising a cold water line (CWL), which enters tank 1, which is used as a recirculation tank, as well as, a water reservoir to dilute salts and minerals that concentrate due to the reverse osmosis desalination process. In addition, tank 1 may act as a pressure vessel for the RO element depending upon the particular RO element configuration used. From tank 1, water passes through a ball valve 4, and then to a cartridge pre-filter 5, for removing suspended solids from the water. In order to move water through the zero effluent desalination system, a booster pump 2 is inserted into the line between the pre-filter 5, and a reverse osmosis element (RO) 3. The booster pump 2, is controlled by either a pressure control switch or a level control switch 11. After going through the RO membrane, the product water passes through a check valve 9, through a ball valve 10, and then to a product water storage tank 8. The control switch 11, monitors pressure in the product water tank 8, after check valve 9, if it is a pressure switch. If the pressure in this line increases to a preset limit, pump 2 shuts off. If control switch 11 senses pressure below the preset pressure, pump 2 is turned on and water is pumped through RO element 3, through check valve 6, and then back to the recirculation tank 1. A flow regulator 7 is also inserted into the line if pressure must be increased above normal water line pressure. If switch 11, is a level control switch, it is connected to the product water storage tank 8, as shown by the dotted line, identified with the term "optional" in FIG. 1a. In this case, control switch 11 will turn pump 2 on and off in the same way as described for the pressure switch. As water is pumped through the recirculation loop (tank 1, ball valve 4, pre-filter 5, booster pump 2, RO element 3, check valve 6 and flow regulator 7), water is flushed past the RO membrane surface in the RO element which reduces the concentration of salts and minerals on the membrane surface at the same time water is being pushed through the RO membrane to create desalinated product water.

When the treated water faucet 12, is opened water flows from the product water storage tank 8, through the carbon filter 13, and then past an ultraviolet light 14. It should be noted the carbon filter 13, and the ultraviolet light 14, are optional and may be used if needed, but are not required for the system to work.

Normal water service to the building comes through faucet 15, for cold water and the hot water service line 16. While the term "faucet" is used throughout this specification, it should be understood that this is merely for convenience, and any type and any number of water fixtures may be inserted into the water lines. For example, clothes washing machines, dishwashers, toilets, showers/tubs, and any other standard devices could be installed at the "faucet" locations.

The system described above can be hooked up anywhere in the CWL to a building. However, a typical place for the recirculation tank 1, to be installed would be in the cold water line just prior to where the line "tees off" to feed a hot water tank (not shown). Another typical location would be under a sink (also not shown) in a location where a treated product water faucet is desired.

If tank 1, is placed in the CWL entering a building, maximum flow through tank 1, can be expected as building occupants use water fixtures such as toilets, showers, washing machines, dishwashers, and faucets. Therefore, no appreciable buildup of total dissolved solids (TDS) such as salts and minerals would be expected to occur and the recirculation process will operate very effectively.

If tank 1, is placed in the cold water line under a sink, that particular cold water faucet must be used occasionally if product water is removed from product water tank 8, to prevent a buildup of TDS in tank 1. The fact that tank 1, represents a water reservoir of several gallons of feed-water reduces the concentration of dissolved salts and minerals in contact with the surface of the RO membrane in RO element 3. The more water used by fixtures represented by faucet 15, the smaller tank 1, must be. If water is not used routinely through fixture 15, tank 1, must be sized larger to accommodate the concentration of salts and minerals as water is desalinated and produced.

Figure 1B:
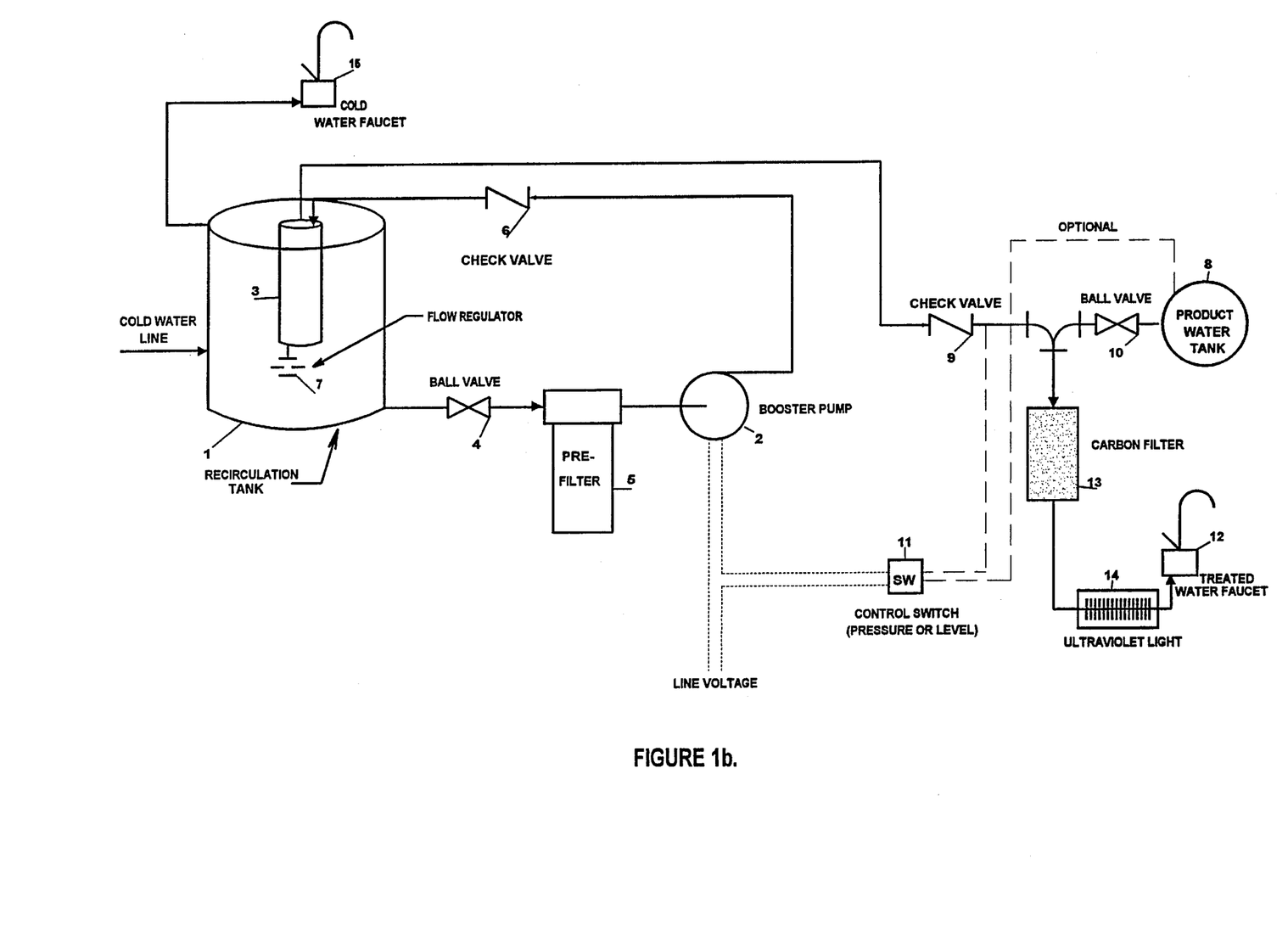
FIG. 1b shows the basic zero effluent water treatment system using a self cleaning reverse osmosis membrane element in which the element is incorporated into a water recirculation/reservoir tank.

FIG. 1b, shows a second embodiment of the zero effluent desalination system. In FIG. 1b, the RO element 3, is positioned in a vertical orientation inside tank 1. As in FIG. 1a, a recirculation loop consisting of a ball valve 4, pre-filter 5, a pump 2, and a check valve 6, are used in the same manner as in FIG. 1a. A flow regulator 7, can be positioned on the outlet of the RO element brine discharge port, as an option, if a pressure boost above normal line pressure is required. The cold water line enters tank 1, and exits to feed the fixtures depicted collectively as faucet 15. As described in the FIG. 1a, system, whenever cold water is used, the feed-water to the RO element (with its accumulated salts and minerals) is diluted and flushed away. Likewise, the recirculation loop also reduces the concentration of salts and minerals near the surface of the RO membrane by flushing through the element. The components in the product water line, shown in FIG. 1b, are the same as those in the product water line of FIG. 1a.

Figure 1C:
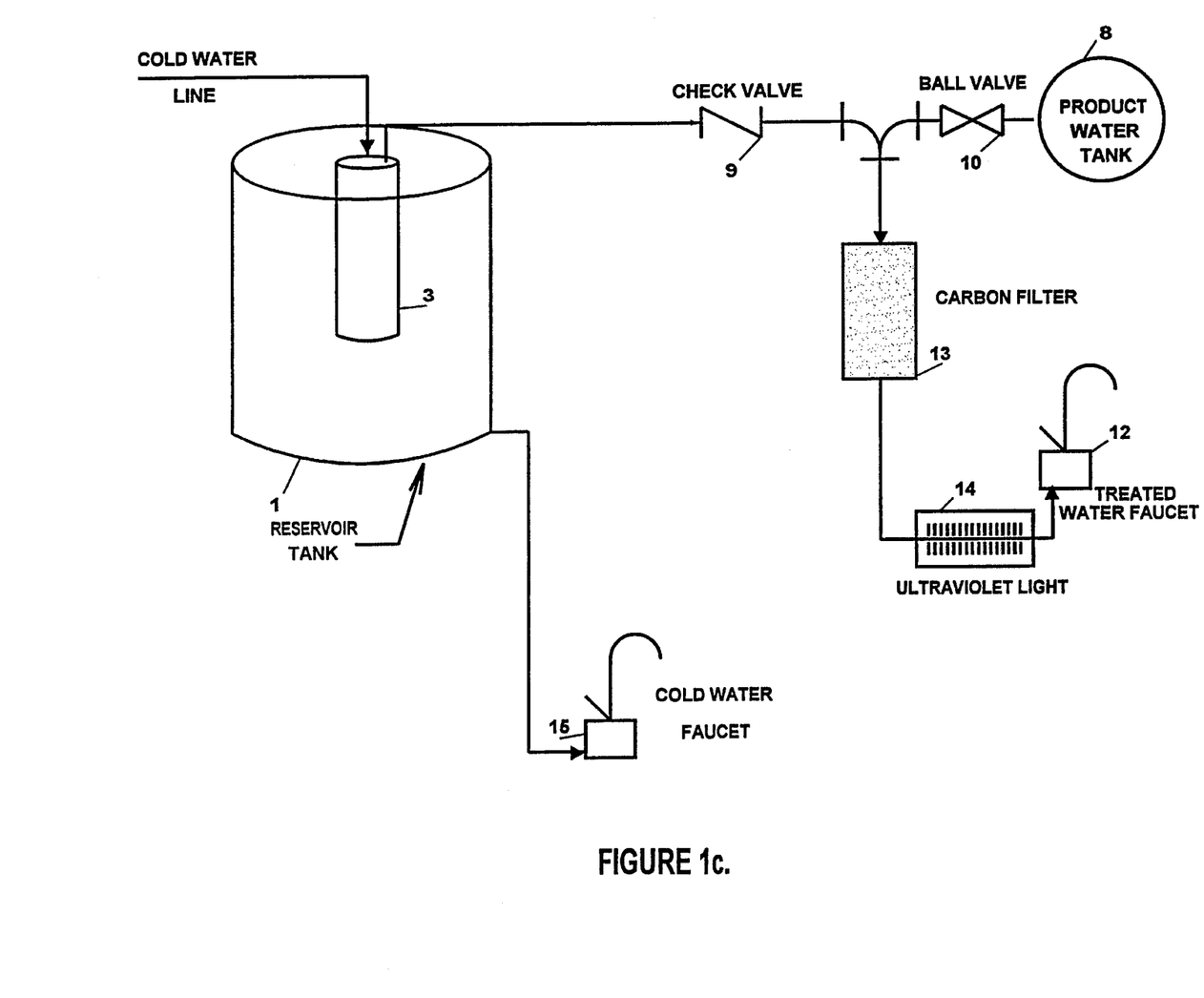
FIG. 1c shows the basic zero effluent water treatment system using a self cleaning reverse osmosis membrane element in which the element is incorporated into a water reservoir tank without the need for a recirculation flow pattern.

FIG. 1c, is another embodiment which shows the RO element 3, positioned in a vertical orientation inside tank 1. As can be seen in FIG. 1c, a pumped recirculation loop is not used. Instead, the cold water line enters tank 1, through the feed/brine spacer channel of the RO element and exits the tank to feed the fixtures depicted collectively as faucet 15. As in the discussion of FIG. 1a, whenever the cold water is used, feed-water to the RO element (with its accumulated salts and minerals) is diluted and flushed away. In this embodiment, however, the flushing action through the RO element is far greater than that of the embodiments of FIG. 1a or FIG. 1b, because every time faucet 15, is used, water flushes directly past the membrane surface through RO element 3.

The other components in the product water line shown in FIG. 1c, are the same as those in the product water line shown in FIG. 1a.

Figure 1D:
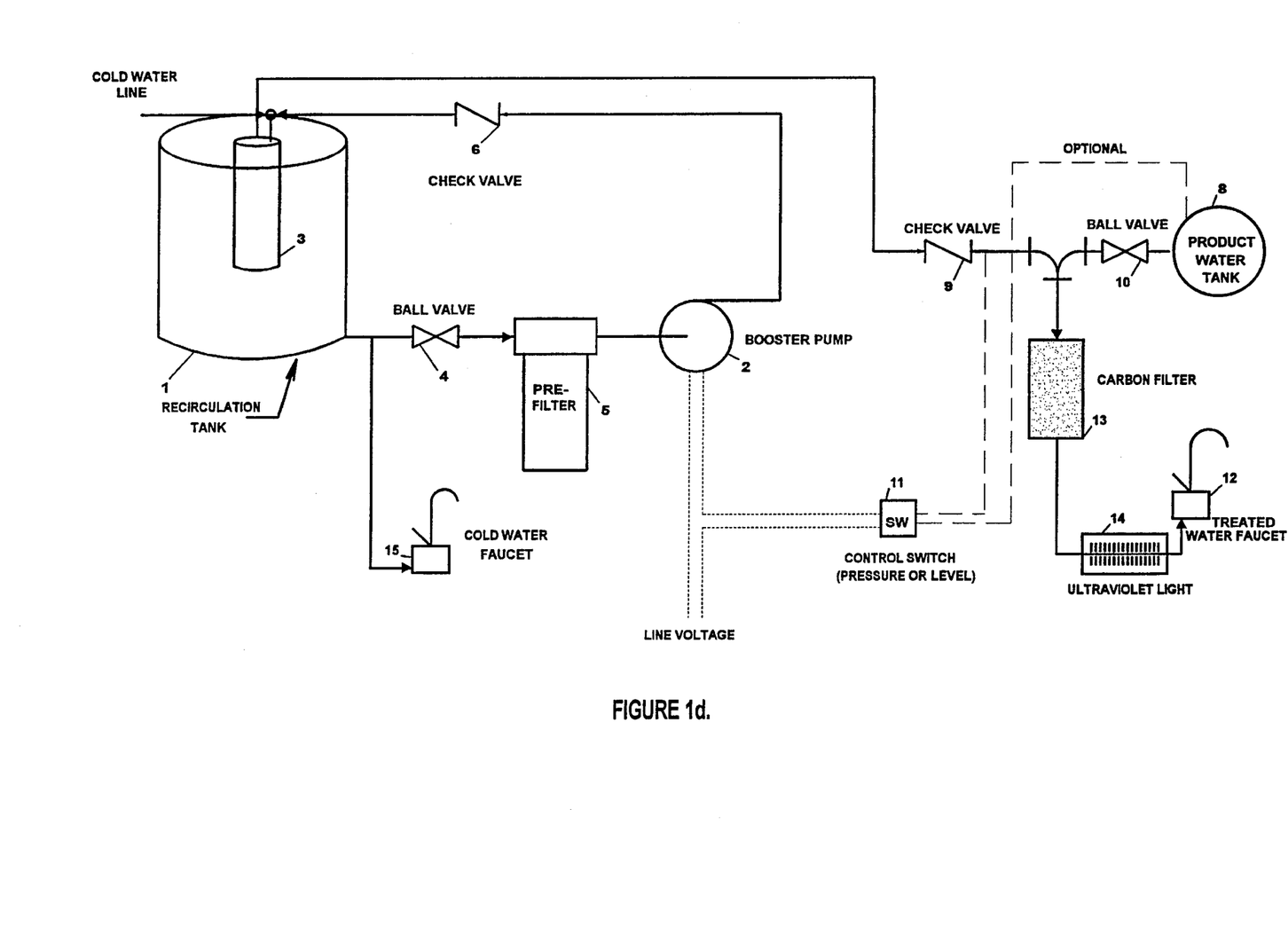
FIG. 1d is a system similar to the embodiment of FIG. 1c but which also incorporates a pumped recirculation flow pattern.

FIG. 1d, is another embodiment which shows the RO element 3, positioned in a vertical orientation inside tank 1. However, this embodiment is a combination of the FIGS. 1b and 1c, systems. As such, a pumped recirculation loop is used through the RO element feed/brine spacer channel, and the cold water line enters tank 1, through the brine channel of the RO element, as well. A water line leading from tank 1, feeds the fixtures depicted collectively as faucet 15. As in the discussion of FIG. 1c, whenever the cold water is used, feed-water/brine inside the RO element (with its accumulated salts and minerals) is diluted and flushed away. Also, as in the FIG. 1b system, the pumped recirculation loop flushes past the RO membrane surface and reduces the concentration of accumulated salts and minerals and prevents fouling of the surface of the RO membrane.

The remaining components in the product water line shown in FIG. 1d, are the same as those in the product water line of FIG. 1a.

Figure 1E:
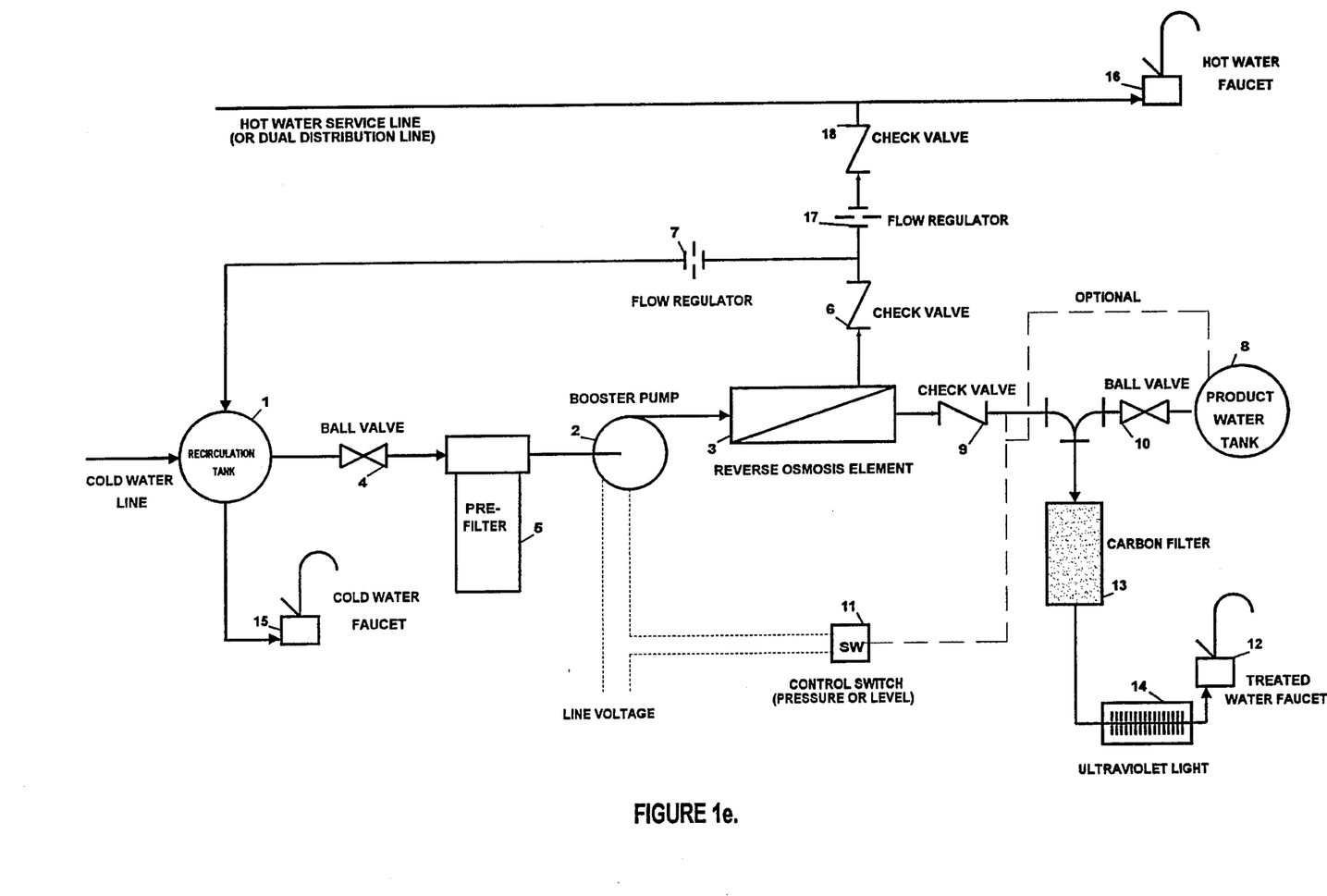
FIG. 1e is a system similar to the embodiment of FIG. 1d, but which allows a percentage of the overall flow to exit into the hot water line.

Another available option is to add an additional line from the recirculation loop to the hot water line, as shown in FIG. 1e. This additional line includes a flow regulator 17, and a check valve 18. When pump 2 operates, flow regulator 17 allows a percentage of the overall flow to exit into the hot water line. This percentage of water would be about 2% to 10% of the overall flow through the recirculation loop. In this way, a buildup of TDS in the recirculation loop is avoided and a zero waste effluent system is maintained. This would only be necessary if the cold water was not used at a water fixture area where desalinated product water was routinely used.

It should also be noted that the embodiment shown in FIG. 1e, would also operate satisfactorily without a recirculation loop and with just a single line from the RO element 3, to the hot water line.

The "waste" brine entering the hot water line blends with water sitting in the line and becomes part of the water consumed when the hot water line is operated (again, maintaining a zero effluent philosophy).

The flow configuration shown in FIG. 1e, shows RO element brine effluent being pumped into the hot water line. If a building has a dual water distribution system (for example, a separate line for potable drinking water and other related water fixtures, and a separate line for toilet flushing and other related water fixtures), the RO brine effluent could be pumped into the secondary distribution line instead of the hot water line. In addition, FIG. 1e shows a pump 2 pressurizing the RO element brine above the normal hot water line pressure. An alternative to this is to reduce the pressure of the hot water line (or dual water distribution line) with a conventional device such as a pressure regulator, as described and shown at 17 in FIGS. 3c and 3d. This would reduce, and in some cases, eliminate the necessity for pump 2.

As previously discussed, there are locations in a water system servicing a residential/commercial building where the cold water fixtures are used insufficiently to flush an RO element in order to keep it from becoming prematurely fouled over the course of its life. The system described in FIG. 1e is one configuration that will allow a zero effluent system to be configured even though this condition exists.

As can be seen, the system in FIG. 1e requires water to flow from the cold water line to a hot water line or dual distribution line. In some locations there may not be a hot water line or dual distribution line to accommodate this configuration. The reduced effluent desalination configuration depicted in FIG. 2a satisfies that situation.

Figure 2A:
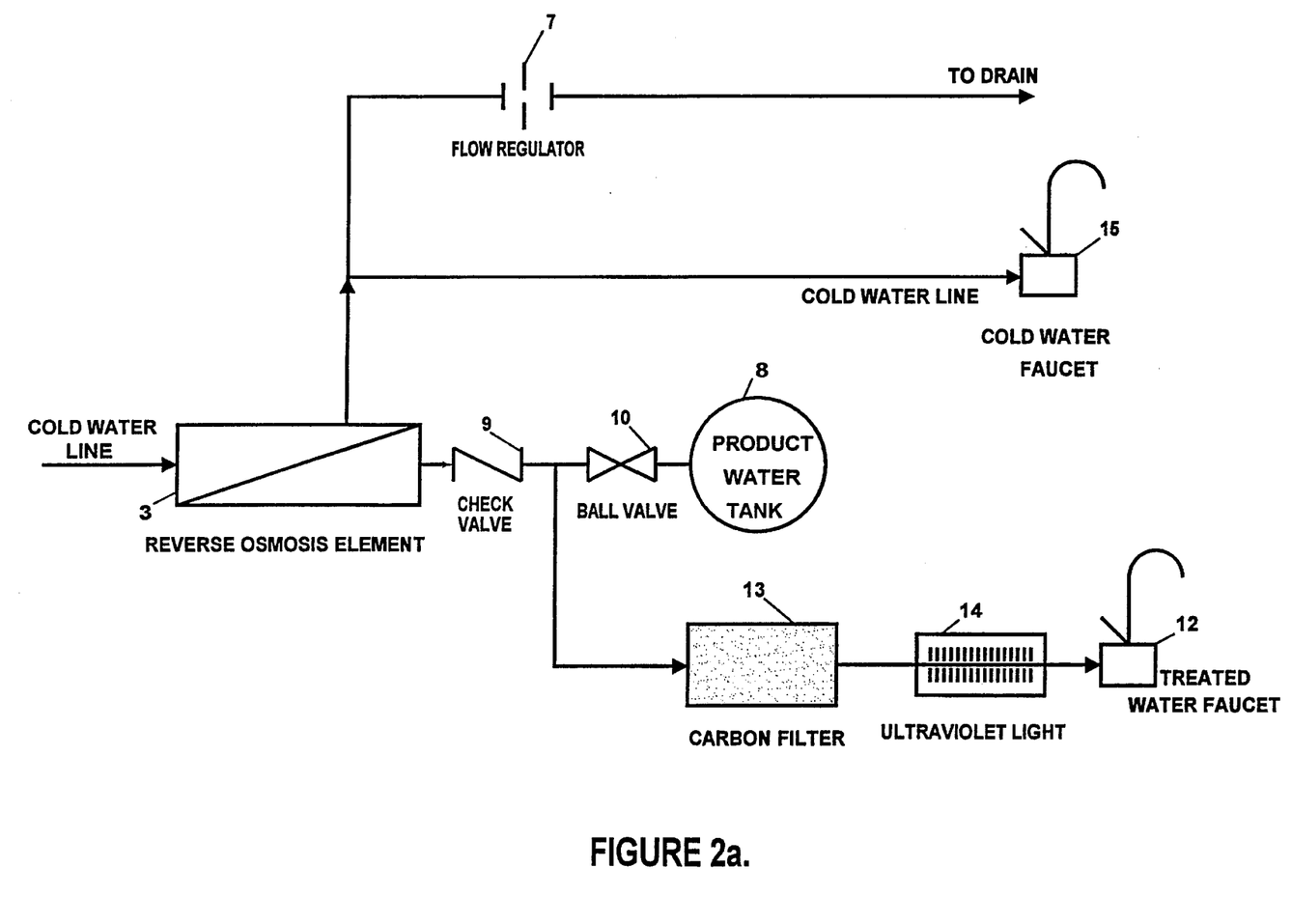
FIG. 2a shows the basic reduced effluent water treatment system using a self cleaning reverse osmosis membrane element.

FIG. 2a shows the cold water line connected to an RO element, with the brine from the RO element connected to the cold water faucet fixture 15, similar in concept to the figures describing the zero effluent systems. However in this configuration, a flow regulator 7 connects the RO element brine line also to a drain. Since the RO element is periodically being flushed when fixture 15 is being used, the quantity of brine that must go to drain can be reduced dramatically from the normal 5 to 1 ratio, down to a 2 to 1 ratio, or less. This results in much less water being wasted: for example if a 10 gallon per day (GPD) RO membrane is used, a conventional system will waste 50 GPD using the 5 to 1 ratio. With the improved configuration described in FIG. 2a, the amount of water wastage would be 20 GPD with the 2 to 1 ratio now possible.

Figure 2B:
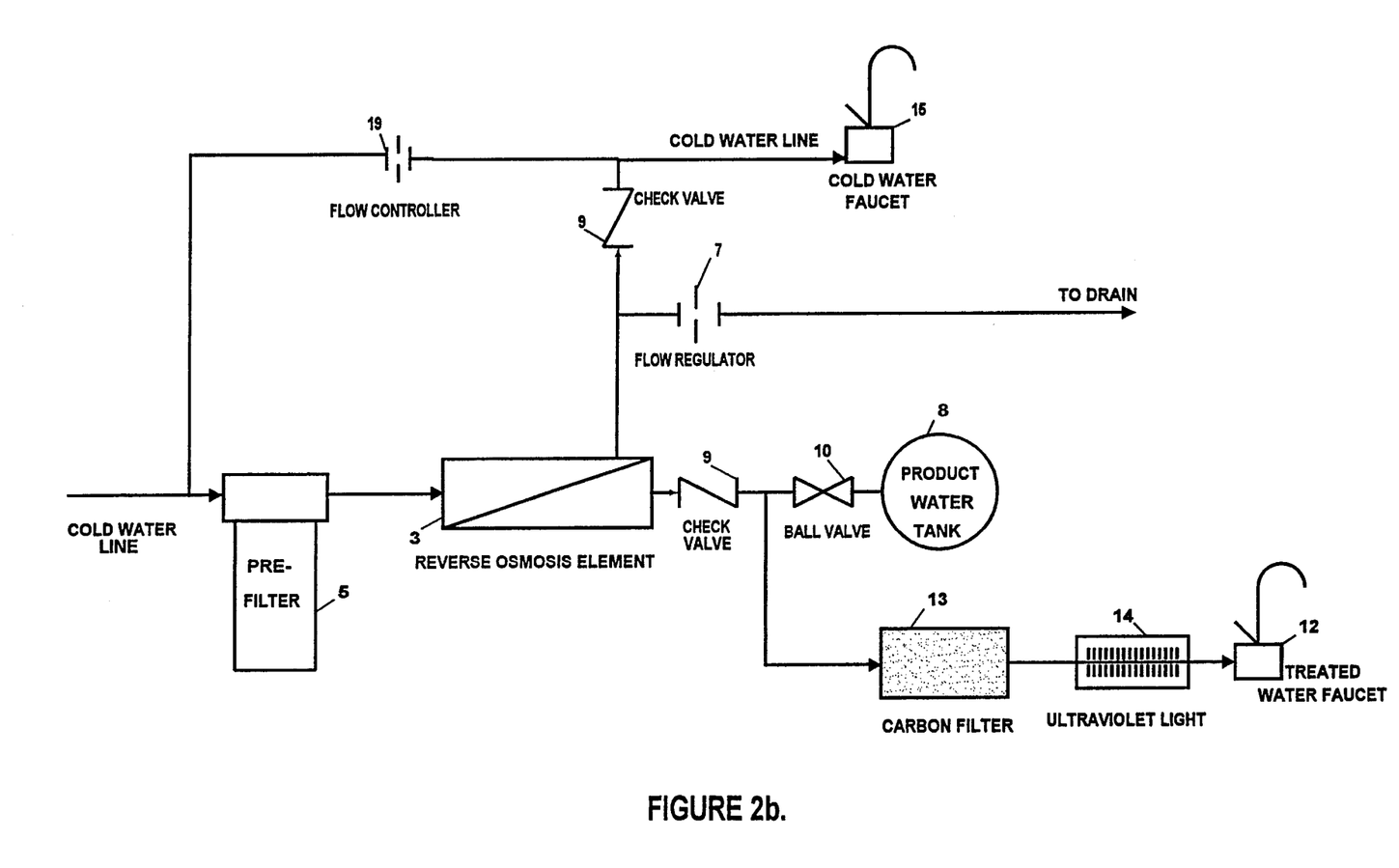
FIG. 2b is a system similar to the embodiment of FIG. 2a, but which allows a partial cold water flow through the reverse osmosis membrane element.

An alternative configuration is depicted in FIG. 2b. In FIG. 2b, an RO element and reduced brine line to drain are connected as in FIG. 2a. However in FIG. 2b, not all the cold water being used by water fixture 15 goes through the RO element. As can be seen in FIG. 2b, the cold water flow is split at a "tee" in the line that allows a portion of the water to flow into the RO element while a portion of the water flows directly to the cold water fixture 15. A flow controller 19 is placed in the cold water line to restrict the flow to approximately 1 gallon per minute. The flow controller reduces the pressure downstream of the device such that water will flow from the cold water line, through the pre-filter and RO element, and back to the cold water line downstream of the flow controller. This will happen whenever fixture 15 is opened and water flows through flow regulator 19. When fixture 15 is closed, water won't flow back to the cold water line, but will flow to drain as long as the product water tank is not full. In this way, the RO membrane will be flushed periodically whenever fixture 15 is used. In addition, a relatively small amount of brine waste will flow to drain keeping the RO element clean even if fixture 15 is not used regularly.

Although this configuration is not a zero effluent system, per se, it does reduce conventional brine waste discharge while allowing for flow surging through the RO element to reduce the concentration of accumulated salts and minerals on the surface of the reverse osmosis membrane whenever fixture 15 is used.

Figure 3A:
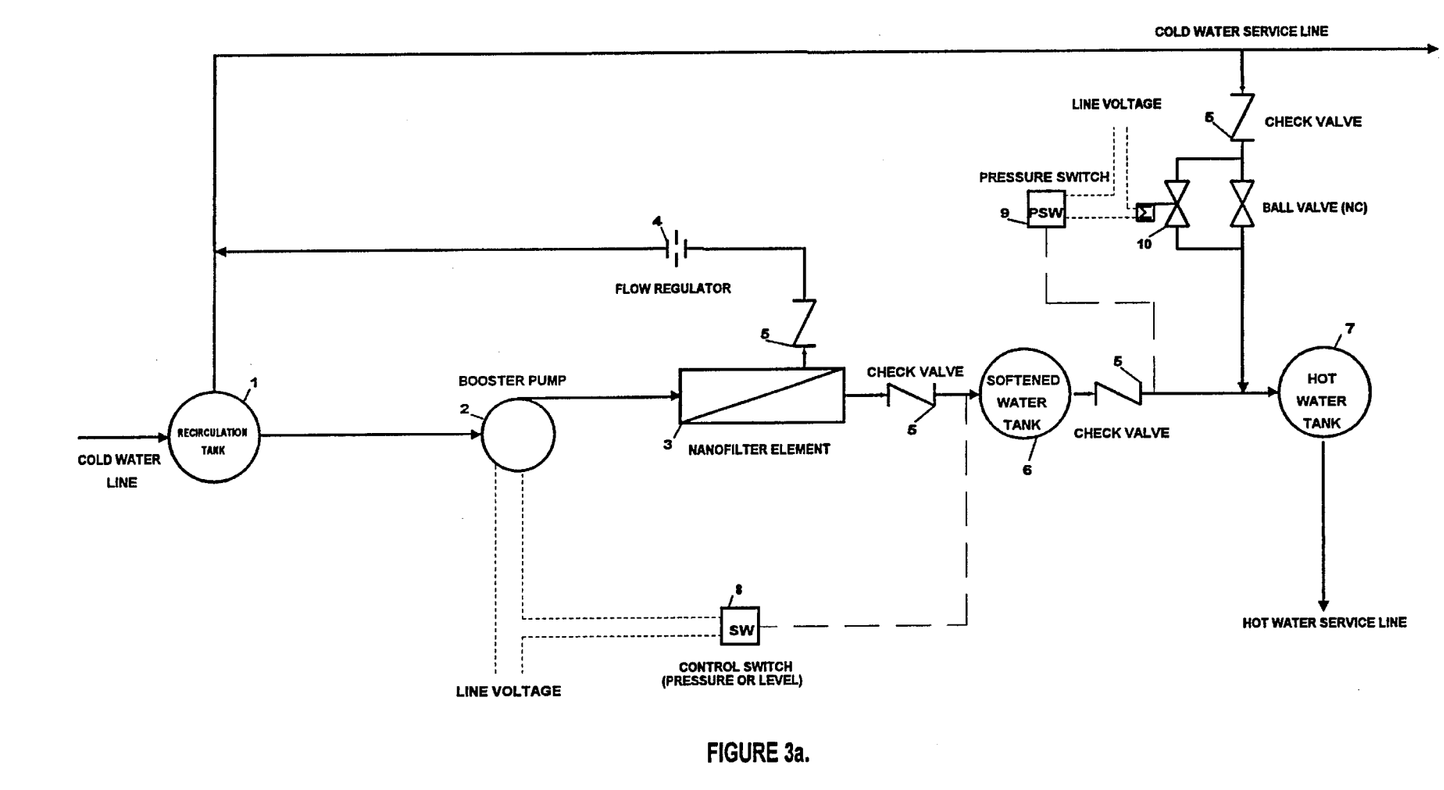
FIG. 3a shows the basic zero effluent water softening system using a self cleaning nanofilter membrane element.

Another water treatment system that uses the same philosophy as the desalination systems shown in FIGS. 1a–1e, is one that can be used to soften the hot water supply for a building. One embodiment is shown in FIG. 3a, where a recirculation tank 1, is inserted in the cold water line (CWL). A pump 2, takes water from tank 1, and pumps it through a recirculation loop that includes a nanofiltration membrane 3.

A nanofiltration membrane rejects divalent ions in water such as the hardness components of water, calcium and magnesium ions, and, therefore, produces what is commonly called "soft" water. A nanofilter membrane allows most monovalent ions such as sodium and chloride to pass through, while it rejects divalent ions. It is the monovalent ions that create osmotic pressure and requires the moderate to high pressures necessary to pump water through a reverse osmosis membrane. Therefore, nanofilter membranes require much less pressure to pump water through the membrane because the hydraulic driving force does not have to overcome the effect of osmotic pressure from monovalent ions. Other devices in the recirculation loop are a flow regulator 4, and check valve 5, which operate in much the same manner as flow regulator 7, and check valve 6, in FIG. 1a. Softened product water flows to a storage tank 6, which, in turn, feeds the building's conventional hot water heater, tank 7.

In operation, this system creates no waste brine because effluent from the nanofilter module 3, is recirculated back to the recirculation tank 1, in the CWL where it is diluted whenever water is used in the building. This embodiment is designed to soften all water used by the hot water line in a building. By softening only the hot water, a very efficient system is created because it is the hot water that is used most frequently with devices that require soft water, such as showers, dishwashers, and clothes washing machines. In addition, this system prevents scale buildup in the hot water lines of a building by removing scale forming substances before the water is heated.

The only controls necessary for this system are two pressure sensing switches, one switch 8, that turns on pump 2, when softened water is needed, and another 9, that opens valve 10, to allow unsoftened water to enter the hot water heater if the softening system cannot keep up with hot water demand. The softened water storage tank 6, would be sized to accommodate typical demands placed on the hot water service for the building.

Figure 3B:
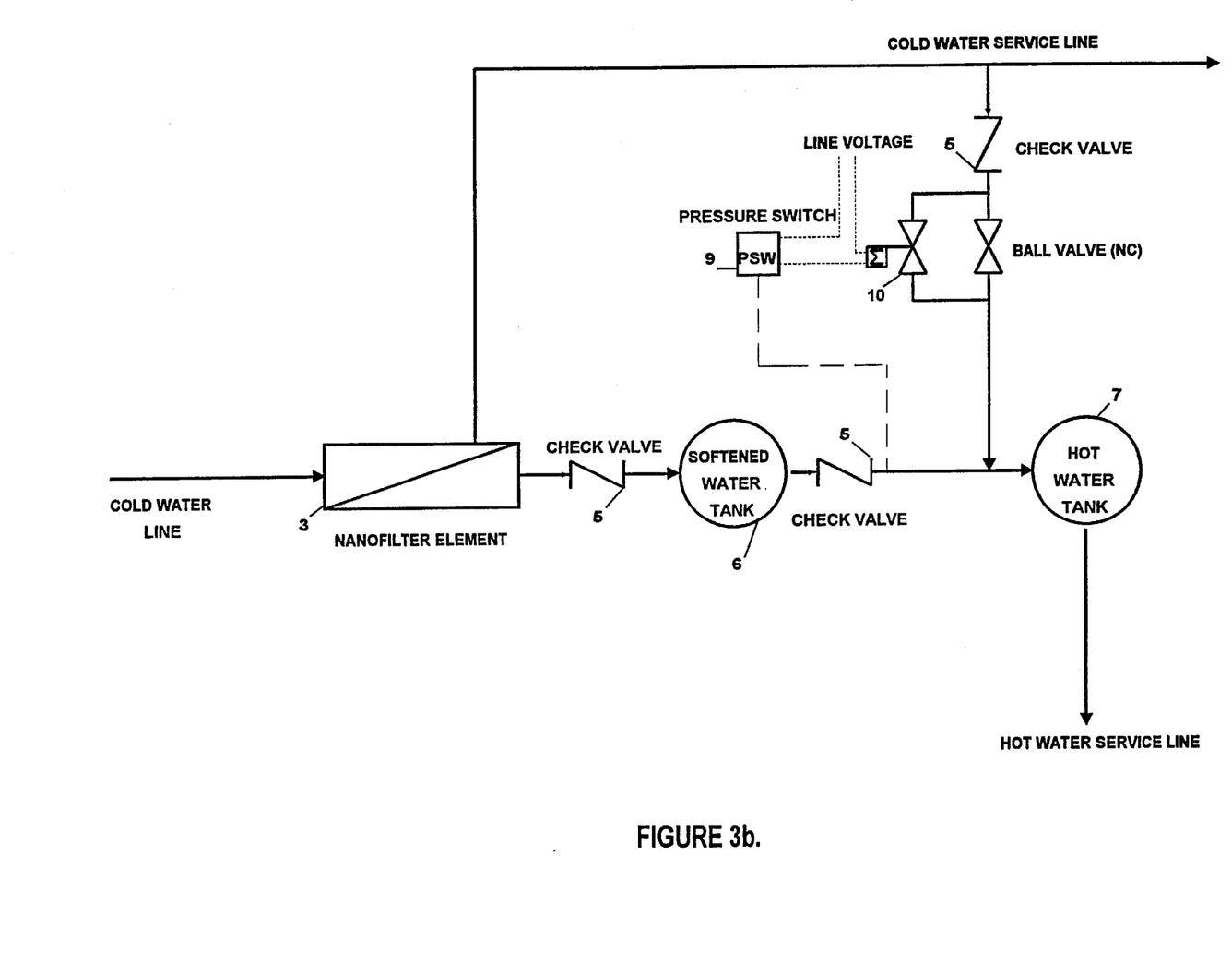
FIG. 3b is a system similar to the embodiment of FIG. 3a, but which allows operation without the need for a pump and recirculation tank/flow pattern.

Another zero waste effluent softening system is shown in FIG. 3b. This is an un-pumped version of the water softening system of FIG. 3a. Here, a membrane module 3, is placed in-line with the cold water service pipe. In this case, normal line pressure must be sufficient to produce softened water for the building. Softened water flows through the nanofiltration membrane contained in module 3, and is stored in tank 6, which feeds the hot water tank 7. The only controls necessary are a pressure switch 9, which opens valve 10, to allow unsoftened water to flow into the hot water heater tank 7, if the softening system cannot keep up with the demand.

Figure 3C:
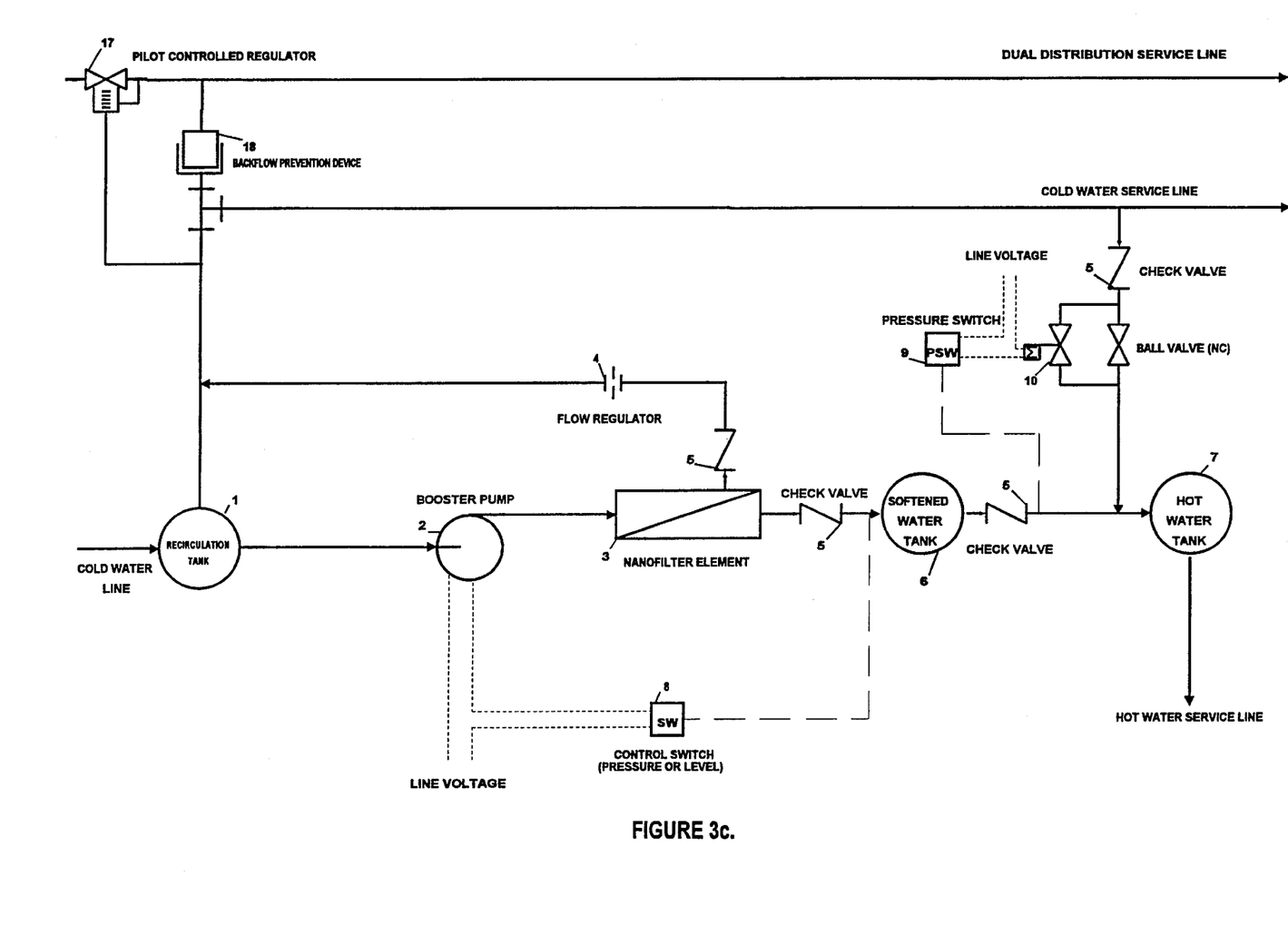
FIG. 3c is a system similar to the embodiment of FIG. 3a, and incorporates a pilot controlled regulator and a back flow prevention device to allow nanofilter brine effluent to be discharged into a dual distribution line.
Figure 3D:
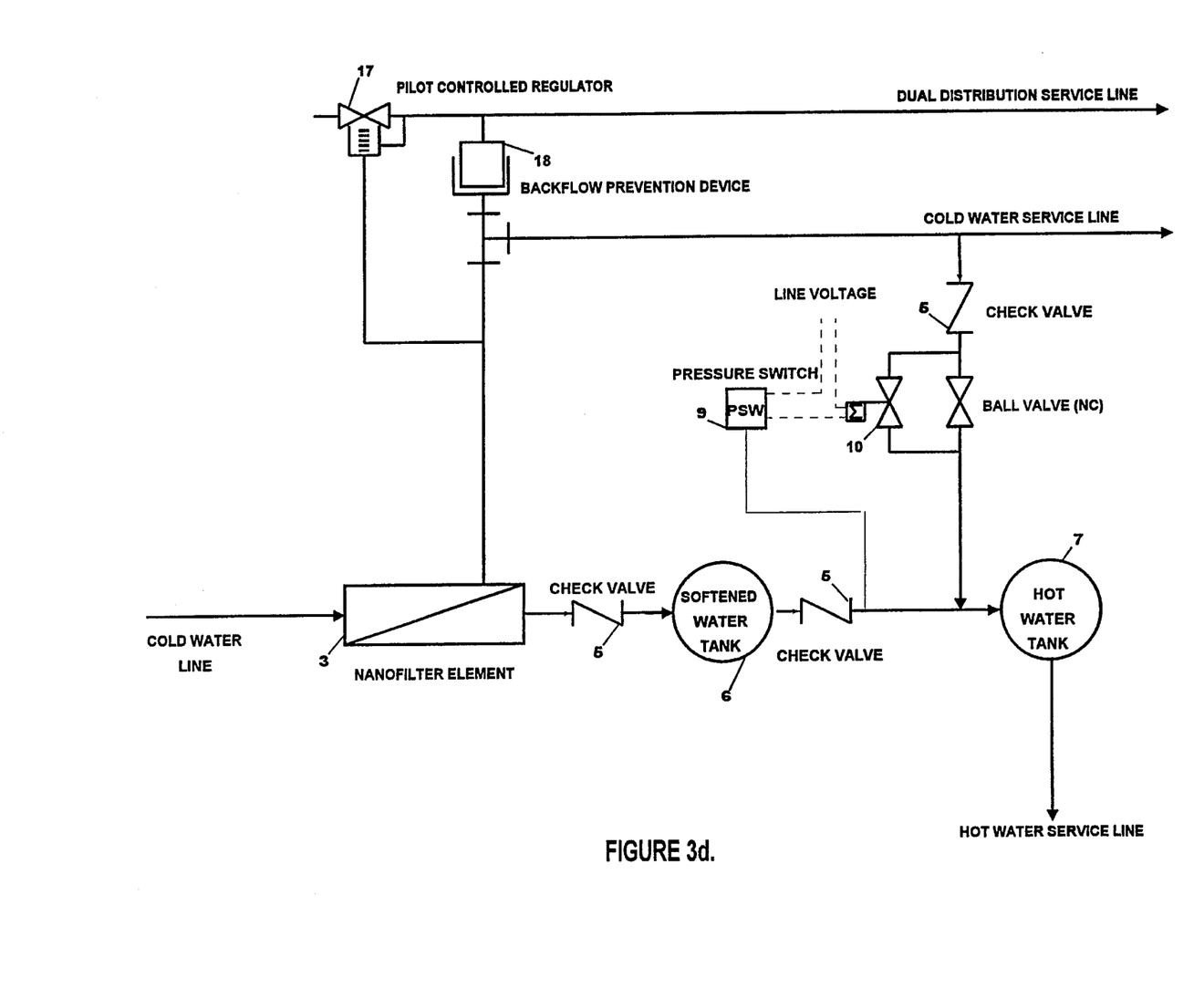
FIG. 3d is a system similar to the embodiment of FIG. 3b which allows nanofilter brine effluent to be discharged into a dual distribution line.

The flow configurations shown in FIGS. 3a and 3b, show nanofilter element brine effluent being discharged into the cold water service line. If a building has a dual water distribution system (for example, a separate line for potable drinking water and related fixtures, and a separate line for toilet flushing and related fixtures), the nanofilter element brine effluent could be discharged into the secondary distribution line instead of the cold water service line. These options are shown in FIGS. 3c and 3d. FIG. 3c, is the same configuration as FIG. 3a, with the added feature of discharging the nanofilter element brine effluent into a dual distribution line. FIG. 3d, is the same configuration as FIG. 3b, with the added feature of discharging the nanofilter element brine effluent into a dual distribution line.

In both FIGS. 3c and 3d, a pilot controlled regulator 17, and a back flow prevention device 18, are used to insure water flow travels from the nanofilter brine effluent line into the dual distribution service line. It should be noted that the above method of insuring that water flow travels from the nanofilter to the dual distribution line is an example only. There are other ways to insure that water flow travels from the nanofilter to the dual distribution system and any of the known methods can be substituted with out departing from the scope of the disclosed invention.

FIGS. 3c and 3d, show softening systems that only treat the water going to the hot water heater. If a dual distribution system is available, a nanofilter element could treat all the water from one distribution line with the brine effluent discharged into the other distribution line, maintaining the zero waste effluent philosophy of this disclosure.

It should also be recognized that in the same way that a minimal effluent RO desalination system was described in FIGS. 2a and 2b as an alternative to a zero effluent system, a minimal effluent softening system could also be configured with a relatively small amount of effluent going to drain.

Throughout the above disclosure the term "RO element" or "membrane module" means any configuration of membrane element, such as, but not limited to, tubular, spiral wound, hollow fiber, and plate and frame element configurations.

Although the zero effluent and minimal effluent reverse osmosis desalination systems and the nanofilter systems, and the method of using the same according to the present invention have been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A desalinization system comprising:

a service water line for connection to a first service water inlet; said service water having a first salt and mineral content;

a water treatment unit containing a housing and a water treatment element dividing the housing into a first compartment for receiving feed water and the salts and minerals in the feed water that do not pass through the element and a second compartment for receiving desalinated product water;

a water inlet connected to the first compartment;

a waste water outlet connected to the first compartment;

a desalinated product water outlet connected to the second compartment;

a first faucet or other first water utilization appliance fluidly coupled to the desalinated product water outlet of the second compartment;

a recirculation tank having a first service water inlet, a second inlet, a first outlet and a second outlet;

a water utilization line connected to the second outlet to the tank and to second utilization appliances;

means connecting said service water line to the first water inlet of the tank;

a loop formed by a first fluid connection between said first outlet of the tank and the inlet to the first compartment of the water treatment element and a second fluid connection between the outlet of the first compartment and the second inlet of the tank;

means for flowing water from said tank through said loop such that a portion of the water from the tank entering the first compartment flows through the element while leaving a portion of its salt and mineral content in the first compartment to form high salinity waste water, said waste water leaves said outlet to the first compartment, enters the tank, mixes with water in the tank and is diluted; and the recirculation tank and its inlets and outlets being constructed and arranged such that in response to water being periodically removed from the recirculation tank through the second outlet, service water is caused to enter the recirculation tank through the first inlet and mix with and dilute waste water in the tank to form utilization water which enters said utilization line through said second outlet of the tank.

2. A system according to claim 1 in which the element is a membrane.

3. A system according to claim 2 in which the membrane is a reverse osmosis or nanofilter membrane.

4. A system according to claim 1 further including a pump in the first fluid connection between the first outlet of the tank to the inlet to the first compartment of the water treatment unit.

5. A system according to claim 4 further including a product water storage tank disposed between said outlet connected to the second compartment and said first faucet or other first water utilization appliance.

6. A system according to claim 5 further including a volume sensor, operable for developing a signal, and operably connected to said storage tank, said pump and a control switch responsive to said signal for activating and terminating said pump.

7. A system according to claim 1 in which the water treatment unit is disposed within the recirculation tank.

8. A method of desalinating water comprising the steps of:

flowing water from a first outlet of a first tank into a first compartment of a water treatment unit divided into first and second compartments by a water permeable element that rejects and/or absorbs salts and minerals from the water to form waste water in the first compartment and desalinated, product water in the second compartment;

combining the waste water with water in the first tank;

periodically flowing supply water through an inlet into said first tank to mix with, dilute and flush said waste water out through a second outlet of said tank; and the first tank, its inlet and its outlets being constructed and arranged such that in response to water being periodically removed from the first tank through the second outlet, supply water is caused to enter the first tank through the inlet and mix with and dilute waste water in the first tank to form utilization water which enters a utilization line through said second outlet of the tank.

9. A method according to claim 8 in which the water treatment unit is disposed in the first tank.

10. A method according to claim 9 in which the supply water is supplied from a line directly connected to said first compartment of said water treatment unit.

11. A method according to claim 10 further including the step of flowing the product water from the second compartment to a product water tank.

12. A method according to claim 11 in which water is periodically passed in through the water treatment unit in response to the volume of water present in the product water tank.

* * * * *